Aug. 30, 1949.    J. C. SHAW    2,480,676
TEMPERATURE-REGULATING VALVE MECHANISM
Filed Dec. 4, 1946    2 Sheets-Sheet 2
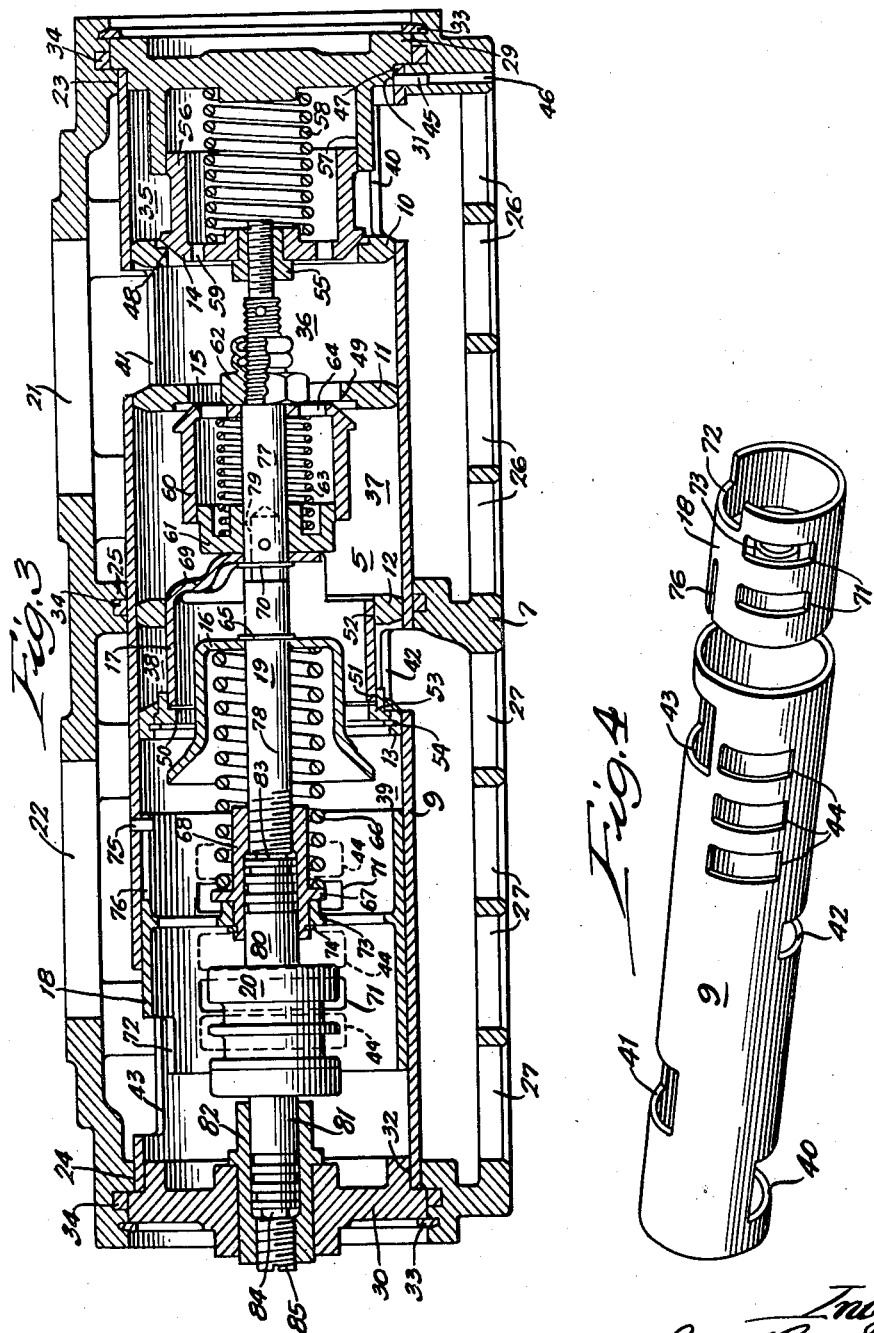
Inventor:
Joe C. Shaw,
By Soans, Pond & Anderson
Attorneys.

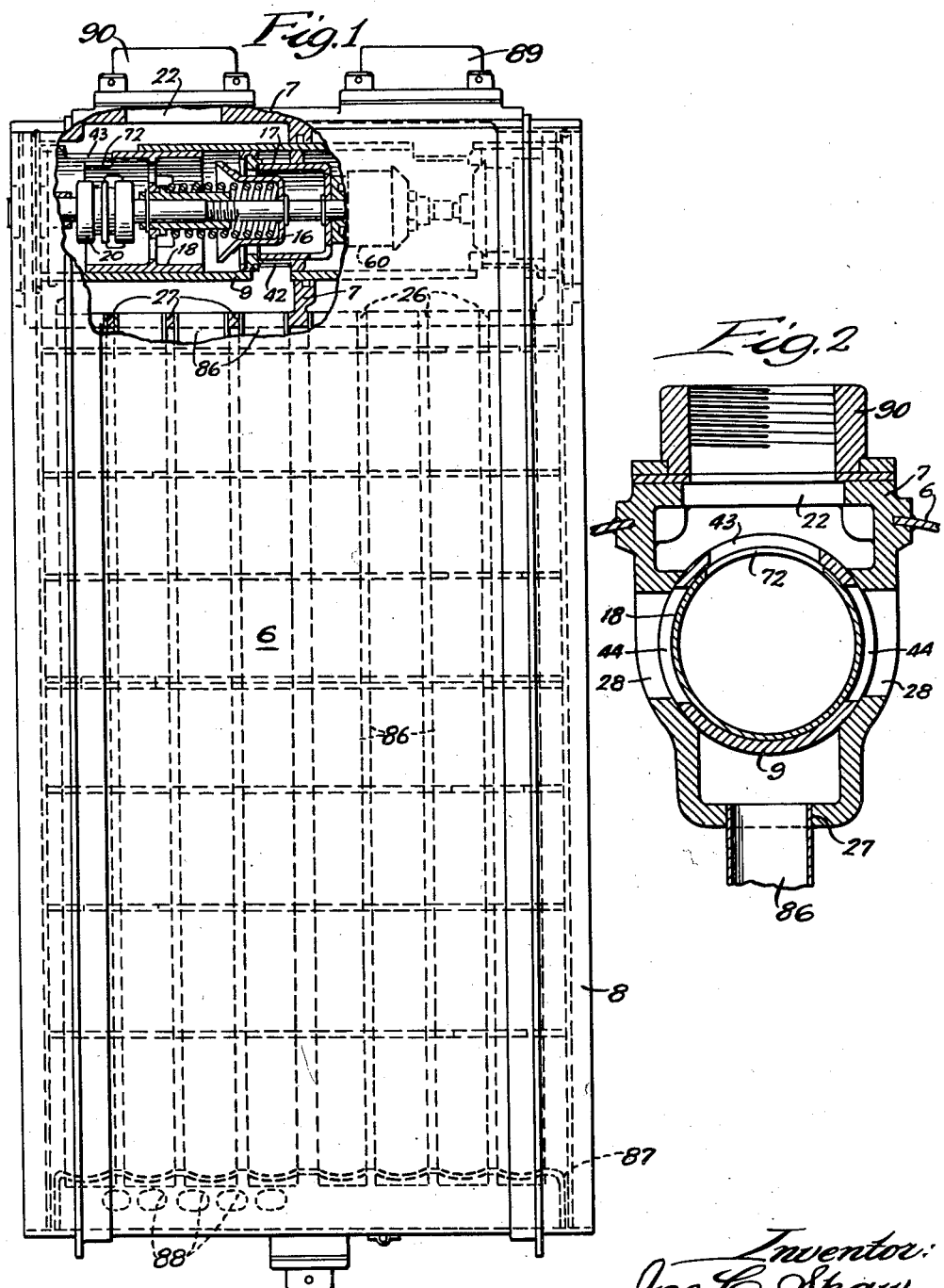

Patented Aug. 30, 1949

2,480,676

UNITED STATES PATENT OFFICE 2,480,676

TEMPERATURE-REGULATING VALVE MECHANISM

Joe C. Shaw, Racine, Wis., assignor to Young Radiator Company, Racine, Wis., a corporation of Wisconsin Application December 4, 1946, Serial No. 713,965

1 Claim. (Cl. 236—34)

During recent years the demands of commerce and the emergencies of war have greatly accelerated the requirements for enlarged and refined aircraft. The constantly growing requirements for greater carrying capacity has necessitated an enlargement and multiplication of the power units. More and larger power units required oil cooling units of expanded capacity and greater flexibility. However, this latter requirement has been accompanied by a demand to reduce the weight and limit the space requirements for the oil cooling equipment and provide constructions which would facilitate repair and replacement.

The main objects of this invention, therefore, are to provide an improved form of valve mechanism for oil cooling devices for use with heat-generating power plants, particularly of the type designed for aircraft; to provide an improved means for mounting the valve seats for such a valve mechanism which permits the machining operations on said valve seats to be performed separately and outside of the valve housing and all of the valve parts to be subsequently assembled within the valve housing; to provide an improved form of valve-seat mounting of this kind which permits the valve housing therefor to be bonded within the casing of an oil cooling unit prior to the assembling of any other parts of the oil cooling unit; and to provide an improved form of valve mechanism mounting of this kind which permits the valve mechanism to be assembled in the valve housing after the work on the oil cooler itself is completed.

A preferred form of valve mechanism embodying this invention is shown in the accompanying drawings, wherein:

Fig. 1 is a side elevation of an aircraft oil cooling device equipped with a valve mechanism embodying this invention;

Fig. 2 is an enlarged cross-sectional detail taken on the line 2—2 of Fig. 1 showing the manner in which the valve housing is suspended within and bonded to the oil cooler casing;

Fig. 3 is a longitudinal sectional view of the valve mechanism taken on the line 3—3 of Fig. 2; and Fig. 4 is a perspective view of the improved sleeve mounting for valve mechanisms of this kind, one of the check valves associatable therewith being shown in its disassembled axial position.

The preferred form of valve-mechanism mounting, embodying this invention, is herein shown incorporated in a valve mechanism 5 of the type set forth in co-pending application Serial No. 713,966, filed December 4, 1946, now Patent No. 2,469,212, dated May 3, 1949. Such a valve mechanism is designed for use with an oil cooling device 6 of the type shown in Shaw-Schlapman co-pending application Serial No. 508,104, filed October 29, 1943, so that the housing 7 of the valve mechanism 5 is suspended from and within the casing 8 of the oil cooling device, as more clearly set forth in co-pending application Serial No. 713,964, filed December 4, 1946, now Patent No. 2,468,519 dated April 26, 1949.

The valve mechanism 5 comprises the housing 7 wherein is supported a sleeve 9 which mounts a plurality of valve-seat partitions 10, 11, 12, and 13 with which co-act the primary valve members 14, 15, and 16 and the secondary valve members 17 and 18, arranged on a valve stem 19, so as to be actuated by the thermostat 20 for controlling the flow of oil from the housing main inlet 21 to the housing main outlet 22 either directly through the housing or indirectly through one or the other of the dual oil-flow paths in the oil cooling device 6.

An oil-cooling device 6 of the type set forth in the aforesaid co-pending application Serial No. 508,104 includes a row of spaced tubes extending diametrically across the casing in a plane disposed axially of the casing and a battery of tubes extending axially of the casing 8 and filling the spaces on the opposite sides of these tubes and between them and the casing 8. These latter tubes have their ends bonded together and to the periphery of the casing 8 so as to form a labyrinth around said tubes in heat-exchange relationship with a cooling medium flowing through said tubes. These two sets of tubes provide two oil-flow paths through the cooling device, one through the diametrically arranged tubes, which is commonly referred to as the "warm-up chamber," and the other the labyrinth around the axially-disposed tubes, which is referred to as the main cooling core.

The housing 7, for the valve mechanism 5, is in the form of a casting the open ends of which have formed thereon annular ribs 23 and 24 and an intermediate annular rib 25 which co-act to provide support for the sleeve 9. In addition to the main inlet and outlet ports 21 and 22, located in the top wall of the housing 7, the housing is provided with an auxiliary outlet port 26 and an auxiliary inlet port 27 formed in the bottom of the housing, and a pair of auxiliary inlet ports 28 formed in the side walls of the housing. As will be noted from Fig. 2, the side walls of the housing 7, whereat the inlet ports 28 are formed, extend inwardly to constitute further support for the sleeve 9, in addition to that afforded by the ribs 23, 24, and 25. Moreover, such formation of the housing wall restricts communication between these several housing ports and the ports which are formed in the sleeve 9, as will appear more fully hereinafter.

End caps or plates 29 and 30 are provided for closing the open ends of the housing. These end caps have annular shoulders 31 and 32 formed on the inner faces thereof which telescope and fit within the adjacent ends of the sleeve 9. These end caps 29 and 30 are held in place by a conventional type of spring ring 33. Gaskets 34 are recessed in the housing 9 outwardly of the ribs 23 and 24 and in the rib 25 so as to form an oil-tight seal between the housing 7 and the end caps 29 and 30 and the sleeve 9.

The sleeve 9, as most clearly shown in Fig. 3, is a tubular member of a length so that it will fit within the housing 7 between the end caps 29 and 30, being supported on the ribs 23, 24, and 25. Within this sleeve are secured the valve-seat partitions 10, 11, 12, and 13 which divide the interior of the sleeve into chambers 35, 36, 37, 38, and 39. Ports 40, 41, 42, 43, and 44 are formed in the sleeve 9 so as to provide communication respectively between the chamber 35 and the housing auxiliary outlet port 26, the chamber 36 and the housing main inlet port 21, the chamber 38 and the housing auxiliary inlet port 27, the chamber 39 and the housing main outlet port 22, and the chamber 39 and the housing auxiliary inlet ports 28, as may be controlled by the operation of the valve mechanism 5 to be explained more fully hereinafter.

The sleeve 9 is located and held in its proper angular position with respect to the housing 7 by means of a pin 45. This pin is inserted through an aperture 46 in the housing 7 adjacent the end cap 29 and engages a recess 47 in the end of the sleeve 9.

The valve-seat partitions 10, 11, 12, and 13 are in the form of annular members brazed or welded on the interior of the sleeve 9. They are provided with central openings which afford communication between the adjacent chambers and permit the formation of valve seats 48, 49, 50, 51 and 52 adapted to co-act with the valve members 14, 15, 16, and 17, respectively in the control of such inter-chamber communication.

It will be noted from Fig. 3 that the valve seats 50 and 51 are formed on a separate ring 53 mounted on the valve-seat partition 13 and held in place by a conventional type spring ring 54.

The primary valve members 14, 15, and 16 are of the poppet type whereas the check valve members 17 and 18 are of the sleeve type.

The valve member 14 is supported on a bushing 55 threaded on the end of the valve stem 19. On the side opposite the tapered part, which engages the valve seat 48, is formed an annular extension 56 which serves as a piston slidably mounted in a cylinder 57 integrally formed on the end cap 29. A spring 58 is interposed between the valve 14 and the end cap 29 and normally urges the valve 14 toward its seat 48. Apertures 59 are formed in the valve member 14 to provide communication between the chamber 36 and the cylinder 57 rearwardly of the valve member 14.

The valve member 15 is of a construction quite similar to the valve member 14 except that the extension 60 serves as a cylinder co-acting with a piston 61. The valve member 15 is slidably mounted on the valve stem 19 inwardly of a nut 62 on said stem and is normally urged against said nut by means of a spring 63 interposed between the valve member 15 and the piston 61. Apertures 64 are formed in the valve member 15 which permit communication between the chamber 36 and the cylinder 60 rearwardly of the valve member 15.

The diameter of the opening through the valve-seat partition 10 is equal to the interior diameter of the piston cylinder 57 whereas the diameter of the opening of the valve-seat partition 11 is slightly greater than the interior diameter of the cylinder 60. This establishes a condition of balance for the valve member 14 and a condition of imbalance for the valve member 15. Accordingly, the movement of the valve member 14 will be confined to the pressure differential between the spring 58 and the action of thermostat 20 under the changing temperature of the oil flowing through chamber 36. On the other hand, the valve member 15, due to a differential in the force of the oil pressure acting on opposite sides of the valve when the valve member 15 is seated under the pressure of the thermostat 20, will retract against the action of the spring 63 to subsequent increasing oil pressure in the chamber 36.

The valve member 16 is bell-shaped and slidably mounted on the valve stem 19, being normally urged into contact with a shoulder 65 on said stem by means of a spring 66 interposed between valve member 16 and a flange 67 on a collar 68 threadingly connected on the valve stem 19.

The valve member 17 is slidably supported on the valve seats 51 and 52 and is connected to the valve stem 19 by means of a spider 69. The hub of the spider embraces the valve stem 19 and the valve is normally urged against shoulder 70, on the valve stem 19, by means of the spring 63.

The valve member 18 is slidably mounted in the sleeve 9 within the chamber 39. It is provided with ports 71 adapted to register with the ports 44 in the sleeve 9 and is recessed at 72 to provide an opening registering with the port 43 in the sleeve 9. This valve member is mounted on the collar 68 by means of a spider 73, the hub of which is held firmly against the flange 67 by means of a spring ring 74. An inwardly-extending pin 75, supported on the housing 9, is received in a slot 76 in the check valve member 18 so as to locate and retain the valve member 18 in its proper angular position with respect to the sleeve 9.

The valve stem 19 is made up of two sections 77 and 78. These are secured together by a slip fit as shown at 79, so that in its assembled form it constitutes a unitary part extending from the chamber 35, where it supports the valve member 14, to the chamber 39, where it is supported in axial alinement with the thermostat 20.

The thermostat 20 is of the Vernet type and comprises two of these devices opposed to each other. The stem 80 for the one thermostat extends into the collar 68 whereas the stem 81 on the other thermostat is received in a collar 82 supported on the housing end cap 30. The pins 83 and 84 for these respective thermostat elements, which are shifted relative to the stems 80 and 81 by reason of the temperature influence on the expansible substance therein, bear respectively against the ends of the valve stem section 78 and a plug 85 threaded into the end of the collar 82.

A valve mechanism of this type is especially suited for assembly with an oil cooling device 6 of the type shown in aforesaid co-pending application Serial No. 508,104, in the preferred relationship as more fully set forth in the aforesaid co-pending application Serial No. 713,966. In such an arrangement the valve housing 7 is suspended within the casing 8 of the oil cooling device 6. The casing is bonded to the housing as shown in Fig. 2 so that only the top wall of the valve housing 7, with its main inlet and outlet ports 21 and 22, is exterior of the casing 8. The upper ends of the warm-up chamber tubes 86 fit into the bottom of the housing 7 in communication with the respective housing auxiliary outlet and inlet ports 26 and 27. At their opposite ends these tubes are connected with a header 87 wherein are formed port openings 88 which provide communication with the main core sections surrounding the usual axially disposed tubes filling the compartment between the tubes 86 and the casing 8.

Such a sleeve mounting for the valve mechanism 5, as herein set forth, lessens the amount of machining that has to be done on the housing 7. This is particularly advantageous where the valve mechanism is to be suspended within the cooler casing 8, as herein shown and described. This permits the highly machined and delicately arranged valve mechanism 5 to be assembled in the valve housing 7 after all the work has been done to install and seal the various tubes which constitute the warm-up chamber and the main cooling core for the cooling device 6.

When the oil cooling device, with the associated valve housing, is ready the assembly of the valve mechanism is as follows:

The valve-seat partitions 10, 11, 12, and 13, after appropriate machining, are welded or brazed in the sleeve 9. The valve member 17 is first placed on the valve stem 77 up against the shoulder 70. Thereupon the piston 61 is slipped onto the stem section 77 after which the spring 63 is placed in position and the valve member 15 slipped onto the valve stem section 77. These parts are secured in place by the nut 62, after which the bushing 55 is placed on the end of the valve stem section.

These partially assembled parts are then placed in position within the sleeve 9, as they are shown in Fig. 3. The valve seat ring 53 is then secured in place by means of the spring ring 54. The valve member 16 is then slipped onto the valve stem section 78 up against the shoulder 65 following which the spring 66 is arranged between the valve member 16 and the flange 67 on the collar 68, screwed onto the end of the valve stem section 78. The valve member 18 next has the spider 73 placed over the end of the collar 68 in position against the flange 67 by the spring ring 74. This sub-assembly of parts on the valve stem section 78 is then inserted into the end of the sleeve 9 so that the slot 76 will receive the pin 75 and the end of the valve stem section 78 enters the end of the section 77.

When these parts are assembled in the sleeve 9 the sleeve is inserted into the valve housing 7 and secured in proper angular position by means of the pin 45. Thereupon the thermostat 20 has the stem 80 slipped into the collar 68 and the collar 82 slipped over the end of the stem 81, following which the end cap 30 is placed over the end of the sleeve 82 and locked in position in the end of the valve housing 7 by means of the spring ring 33. Next the valve member 14 is placed in position upon the bushing 55. The spring 58 is then arranged on the valve member 14, in the position shown in Fig. 3, whereupon the end cap 29 is slipped into place and locked by means of the spring ring 33.

Fittings 89 and 90, of a suitable character, are secured to the valve housing 7 whereby the housing main inlet and outlet ports 21 and 22 respectively may be connected into the lubricating oil line, after the cooling device 6 has been properly secured in place on the aircraft.

The operation of the valve mechanism is, briefly, as follows:

Assume that the oil in the cooling core of the cooling device 6 is so congealed that it would be unsafe to have the pressure of the oil line applied thereto. Such a temperature of the oil would of necessity actuate the thermostat 20 so that the valve members 14, 15, 16, 17, and 18 would occupy the positions shown in Fig. 3. Thus communication between the housing main inlet port 21 and main outlet port 22 would be direct through the sleeve from the chamber 36 through the chambers 37, 38, and 39.

It will be noted that when the valve stem 19 is so retracted the valve member 17 is seated on the valve seat 51. This closes the sleeve port 42. Likewise the valve member 18 is shifted so that the port 44 are not open to the housing auxiliary ports 28. It is, therefore, impossible for the oil line pressure, applied to moving the oil through the sleeve, to exercise any back pressure through the ports 42 and 28 on either the warm-up chamber tubes 86 or the main cooling core.

As soon as the oil traveling through this path has become sufficiently warm to make it safe for the line pressure to be applied to the warm-up chamber, comprising the tubes 86, the thermostat 20 will have shifted the valve stem 19 to the right of Fig. 3 sufficient to seat the valve member 15 but unseat the valve member 14. Thereupon the path of the oil from the housing main inlet port 21 to the main outlet port 22 would be indirect through the warm-up chamber of the cooling device.

Such movement of the valve stem 19 retracts the valve member 17 thereby opening the port 42 and permitting the exit of oil from the warm-up chamber through the housing auxiliary inlet port 27, through the port 42, into the chamber 38, thence to the chamber 39, and out through the sleeve outlet port 43. Obviously the seating of the valve member 15 on the valve seat 49 precludes any oil flow between the sleeve chambers 36 and 37. However, in the event the condition of the oil in the warm-up chamber should make it unsafe for the oil line pressure to be applied to the oil in the warm-up chamber the spring 63 will yield so as to permit an escape of oil through the opening in the valve-seat partition 11 until such time as the condition of the oil in the warm-up chamber makes it safe to apply the line pressure to the movement of the oil therethrough.

As the temperature of the oil rises further the thermostat 20 acts to continue the movement of the valve stem to the right of Fig. 3 until the bell-shaped valve member 16 is seated on the valve seat 50. This closes communication between the chambers 38 and 39 so that the oil can no longer pass through the housing auxiliary port 27. This backing up of the oil in the warm-up chamber tubes 86 causes the oil to flow out through the ports 88 in the header 87 (see Fig. 1) from whence it passes through the main core section and through the housing auxiliary inlet ports 26 communicating with the registering sleeve ports 44 and check valve ports 71 and out through the port 43 to the housing main outlet port 22.

Variations and modifications in the details of structure and arrangement of the parts may be resorted to within the spirit and coverage of the appended claim.

I claim:

A valve mechanism of the class described comprising, an open-ended housing having formed therein main inlet and outlet ports and auxiliary outlet and inlet ports, an end cap removably seated in each end of said housing, a sleeve supported in said housing and having ports formed therein affording communication between said housing ports and the interior of said sleeve, separately formed valve-seat partitions bonded within said sleeve adjacent to said sleeve ports to form an end chamber communicating through one of said sleeve outlet ports with the auxiliary housing outlet port, an adjacent chamber communicating through a sleeve port with said housing main inlet port, a third chamber communicating through another of said sleeve ports with a housing auxiliary inlet port, and two other chambers one of which is located between said adjacent and third-mentioned chambers and the other of which is an end chamber communicating through another of said sleeve ports with said housing main outlet port, said valve-seat partitions providing communication between adjacent chambers axially thereof, a sectional valve stem one section of which extends through said adjacent chamber and the chamber between said adjacent chamber and said third-mentioned chamber and into said first-mentioned end chamber, the second section of which stem is detachably secured to said one section and extends through said third-mentioned chamber and into said other end chamber, the third section of which is in the form of a flanged collar detachably secured on the end of said second section opposite said first stem section, a shoulder formed on said first stem section adjacent the inner end thereof, a piston member slidably mounted on said one stem section inwardly of said shoulder, a valve member slidably mounted on said one stem section and on said piston, a nut threadingly mounted on said first stem section and adapted to limit the movement of said valve member, a spring interposed between said piston member and said valve member and normally urging said members toward said shoulder and nut respectively, a second valve member mounted on the end of said one valve stem and located in said first-mentioned end chamber, said valve member having a piston formed thereon slidably supported in a cylinder formed on the adjacent end cap, a spring interposed between said valve member and said end cap and normally urging said valve member toward its valve seat, an annular shoulder on said second valve stem section adjacent said one valve stem section, a valve member slidably mounted on said second valve stem section, a spring interposed between said valve member and the flange on said valve stem collar and normally urging said valve against said annular shoulder on said second valve stem section, a double-acting thermostat located in said other end chamber having one of the stems thereof telescopingly arranged in said valve stem collar with the shiftable pin therein abutting against the end of said second valve stem section, a collar on the other end cap for said housing telescopically supporting the other thermostat stem, and an adjustable plug in said second-mentioned collar constituting an abutment for the shiftable pin in said second thermostat stem.

JOE C. SHAW.

REFERENCES CITED

The following references are of record in the file of this patent:

UNITED STATES PATENTS

| Number | Name | Date |
|---|---|---|
| 1,061,690 | Rice | May 13, 1913 |
| 1,208,130 | Fulton | Dec. 12, 1916 |
| 1,330,342 | Brell | Feb. 10, 1920 |
| 1,807,040 | Leonard | May 26, 1931 |
| 1,861,396 | Isbell | May 31, 1932 |
| 1,873,769 | Lang | Aug. 23, 1932 |
| 1,947,527 | Lamond | Feb. 20, 1934 |
| 1,989,585 | Bigelow | Jan. 29, 1935 |
| 2,288,599 | Ramsaur | July 7, 1942 |
| 2,374,639 | Miller | Apr. 24, 1945 |
| 2,379,109 | Shaw | June 26, 1945 |
| 2,396,053 | McEntire | Mar. 5, 1946 |